United States Patent [19]

McDougall

[11] Patent Number: 4,528,166

[45] Date of Patent: Jul. 9, 1985

[54] RECOVERY OF GOLD AND/OR SILVER FROM CYANIDE LEACH LIQUORS ON ACTIVATED CARBON

[75] Inventor: Gloria McDougall, Johannesburg, South Africa

[73] Assignee: Sentrachem Limited, Marshalltown, Johannesburg, South Africa

[21] Appl. No.: 491,648

[22] Filed: May 5, 1983

[51] Int. Cl.$^3$ .......................... C01G 3/00; C22B 11/00
[52] U.S. Cl. .................................... 423/23; 75/118 R
[58] Field of Search ........................ 75/118 R; 423/23

[56] References Cited

U.S. PATENT DOCUMENTS

| 3,970,737 | 7/1976 | Davidson | 75/118 R |
| 4,113,467 | 9/1978 | Harrington | 75/118 R |
| 4,163,664 | 8/1979 | Ugo | 75/118 R |
| 4,208,378 | 6/1980 | Heinen | 75/118 R |
| 4,267,069 | 5/1981 | Davidson | 75/118 R |
| 4,273,579 | 6/1981 | Okugawa | 75/118 R |

Primary Examiner—Peter D. Rosenberg
Attorney, Agent, or Firm—David W. Selesnick

[57] ABSTRACT

The invention concerns the concentration or recovery of gold or silver from cyanide liquors containing either or both of them by contacting the liquors with activated carbon in order to load it with $Au(CN)_2{}^-$ or $Ag(CN)_2{}^-$ according to the particular isotherm, removing the loaded carbon and treating it with hydronium or metal cations or molecular complexes in order to convert the $Au(CN)_2{}^-$ and $Ag(CN)_2{}^-$ to insoluble AuCN or AgCN and then recycling the thus treated carbon to contact further liquor, whereby the loading of the activated carbon is far in excess of that possible by conventional reversible loading and recovery of such precious metals by converting them to reversibly loaded AuCN and AgCN which desorb down to their limits set by their respective equilibrium adsorption isotherms.

5 Claims, 6 Drawing Figures

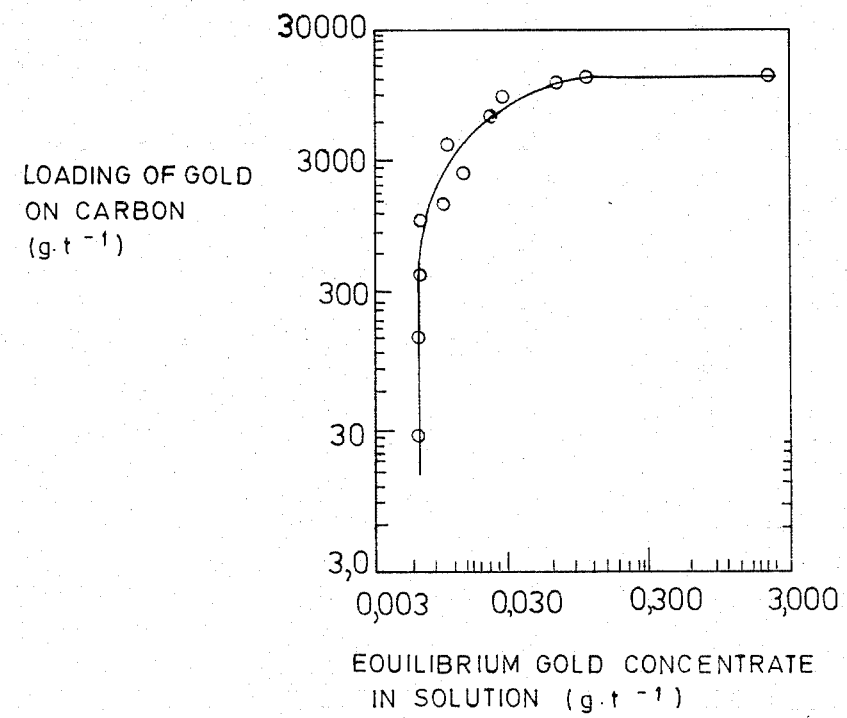
FIG_1

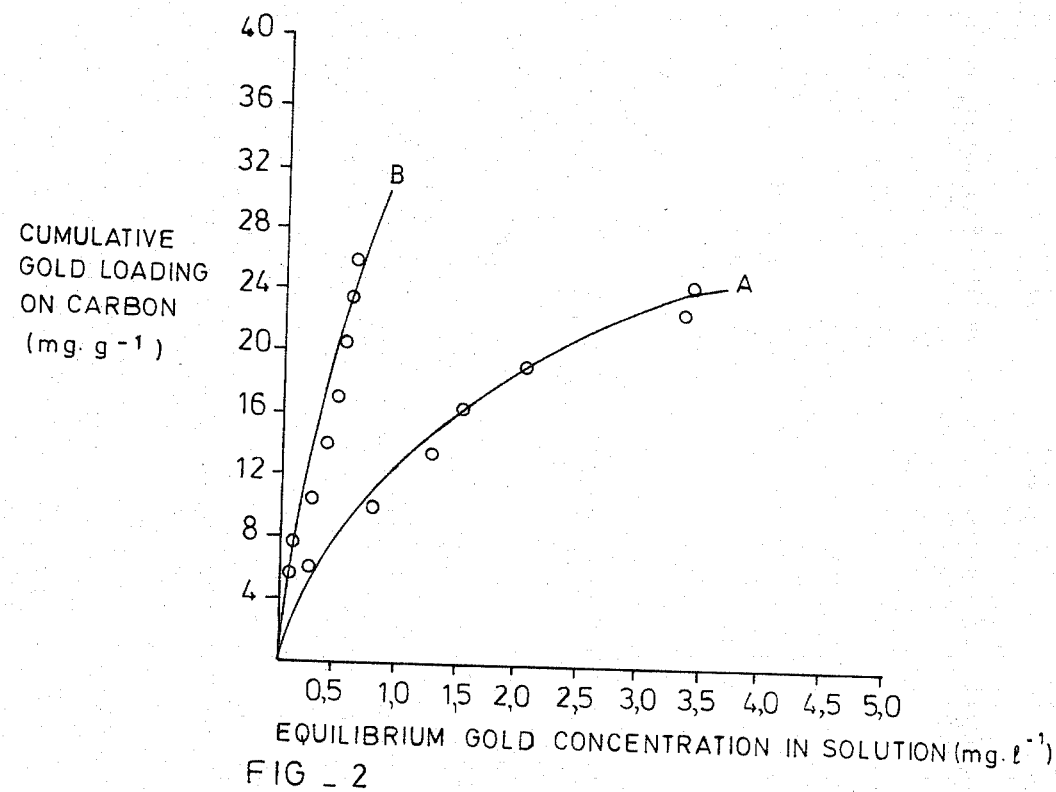
FIG_2
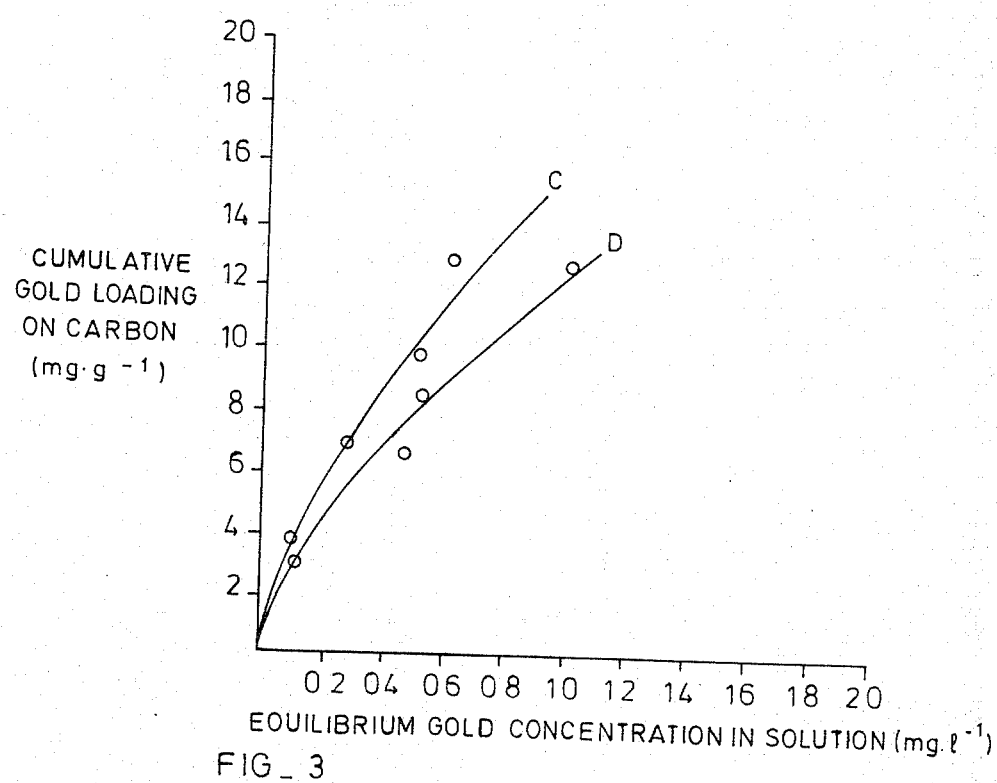
FIG_3

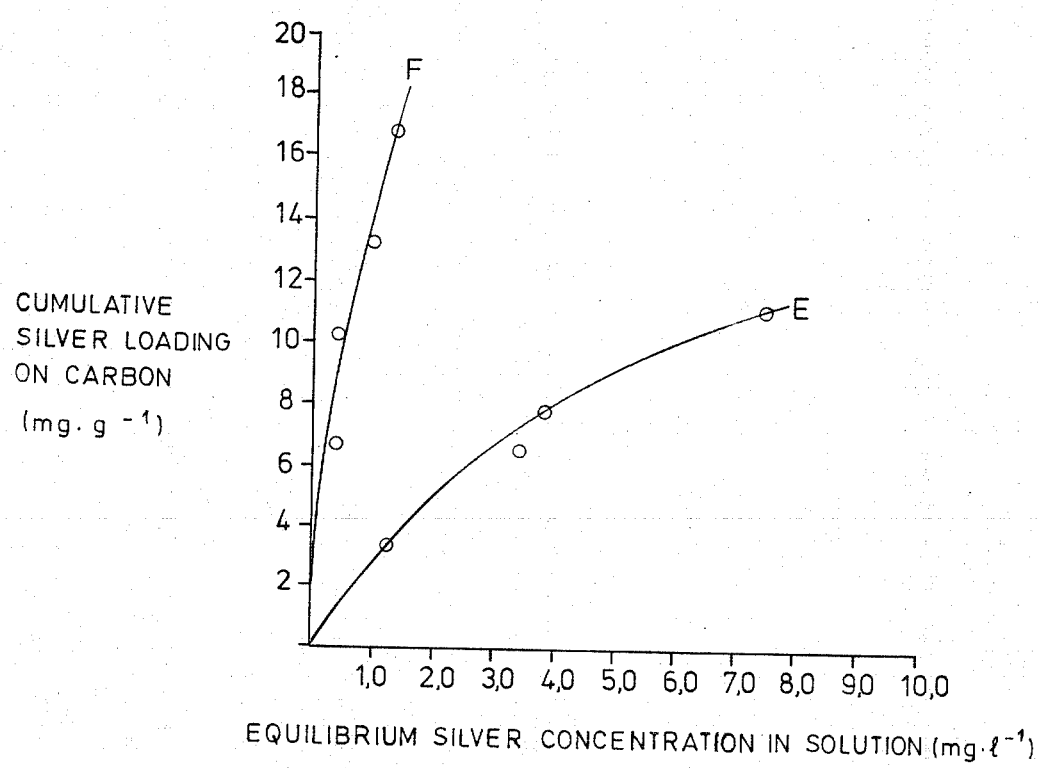
FIG_4

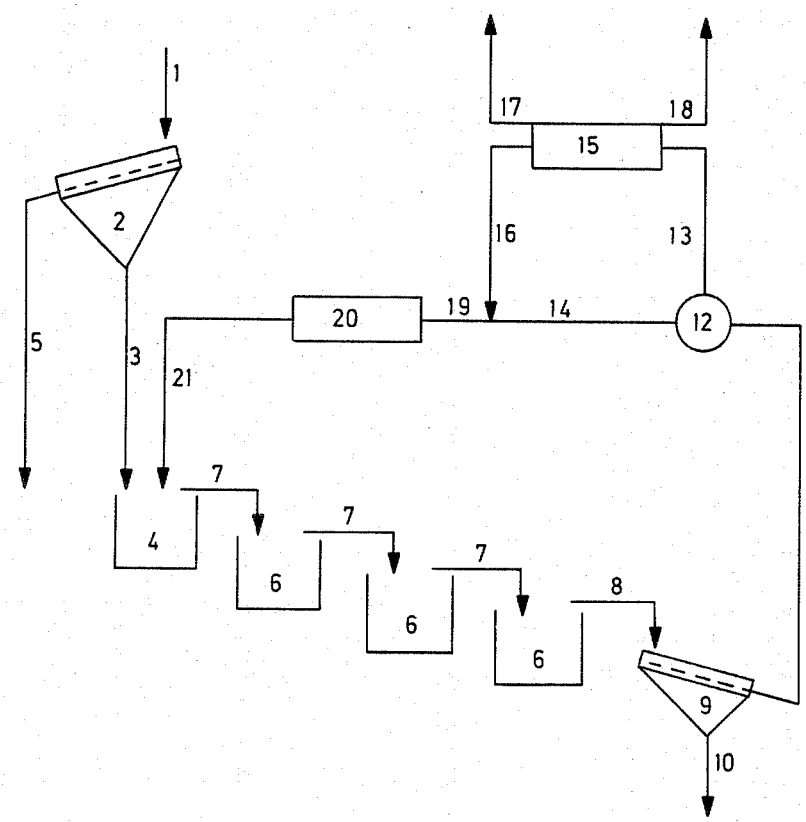
FIG_5

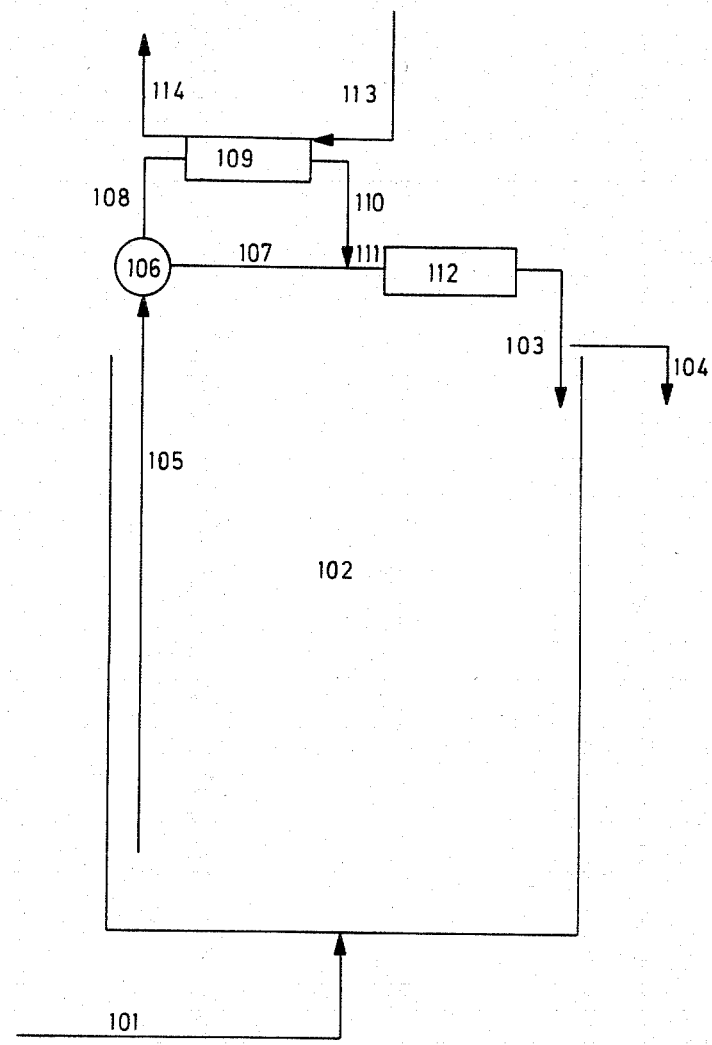
FIG_6

RECOVERY OF GOLD AND/OR SILVER FROM CYANIDE LEACH LIQUORS ON ACTIVATED CARBON

FIELD OF THE INVENTION

This invention relates to the concentration and/or recovery of precious metals from cyanide leach liquors onto activated carbon, and subsequent recovery of the precious metal values by a relatively low temperature (under 90° C.) elution procedure. In this specification, any reference to gold is intended to include a reference to silver as well.

The term leach liquor is intended in the context of this specification to embrace any pulp or solution containing dissolved precious metals and/or other metal cyanides.

BACKGROUND OF THE INVENTION

Cyanidation is a well known process for extracting gold and silver from their ores. The process involves grinding the ore and then leaching the ore in the presence of oxygen with a mixture of lime and cyanide, which results in the dissolution of the gold and silver values as the dicyanospecies viz., $Au(CN)_2^-$ and $Ag(CN)_2^-$, respectively. The precious metal values may be recovered from the leach liquors by adsorbing the values onto activated carbon. Adsorption may occur directly from the cyanided pulp as in the carbon-in-pulp process, or from solution, where fluidized or fixed bed contactors containing granular carbon are generally employed. Since the amount of gold that can be extracted onto the carbon is strongly dependent on the initial concentration of gold in solution, and is in equilibrium with the concentration of gold remaining in solution (see FIG. 1), high gold loadings on the carbon cannot be achieved from typical leach liquors or secondary mining effluents e.g., Merril tails or damreturn water.

Other disadvantages of conventional carbon-in-pulp and carbon-in-leach circuits for the recovery of precious metal and other cyanides are:

The operational problems experienced with interstage screening.

During the many hours carbon resides in a circuit, it becomes fouled physically, or poisoned reducing its capability for recovering desired species.

Having to accept either low recovery or relatively low loadings and thus eluate tenors of some species when attempting co-recovery of multiple species which have isotherms that differ significantly.

Large carbon inventories are needed to compensate for the drop in rate of adsorption as carbon approaches saturation relative to the isotherm in each stage.

The many air inlets for sweeping interstage static screens and for interstage airlifting introduce oil, $CO_2$ and $O_2$ which can all be deleterious to the process.

Furthermore, the adsorbed gold values are difficult to strip from the carbon, and rapid and efficient elution with a caustic-cyanide solution can only be achieved at elevated temperatures, typically greater than 90° C. Conducting the elution under pressure or modification of the eluant by addition of organic compounds also has a beneficial effect on the rate of elution, but these processes are more complicated to implement.

Generally, the conventional processes have required the need for relatively large quantities of eluant leading to large volumes of dilute electrolyte.

There is also a risk of mixing substantial quantities of acid and cyanide in the elution equipment and consequent generation of hazardous HCN in the event of the failure of certain valves.

The adsorption of dissolved gold cyanide onto activated carbon is represented by Equation (1),

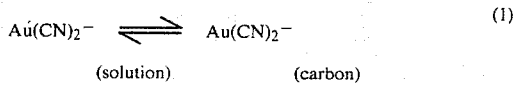

which indicates that adsorption of gold onto the carbon is highly favoured. If the dicyano-gold species in the carbon can be converted into a species that is insoluble in the aqueous loading medium, the reaction represented in Equation (1) will be driven to the right, resulting in a further increase in the ability of the carbon to load gold. Thus treatment of the carbon so as to promote the reaction represented in Equation (2),

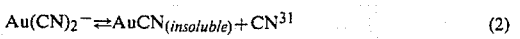

may be expected to enhance the ability of activated carbon to extract gold.

OBJECT OF THE INVENTION

It is the object of this invention to enhance the gold (and silver) capacity of activated carbon adsorbents by converting the precious metal content of activated carbon, that loads by a reversible mechanism, to a species that is held irreversibly. This can be achieved by driving the equilibrium shown in Equation (2) to the right.

In contrast to existing technology, this feature would allow precious metal loadings to be achieved that are far in excess of that dictated by the reversible loading isotherm.

The second object of this invention relates to the treatment of the loaded carbon to restore irreversibly loaded precious metal values, to reversibly loaded species, so that the fraction which is in excess of the amount corresponding to the equilibrium isotherm, desorbs under ambient or relatively low temperature conditions. In contrast to existing technology, this allows for significant desorption at relatively low temperature compared to the 90° C. minimum generally applied.

DEFINITIONS OF THE INVENTION

A method of concentration and/or recovering precious metals from cyanide liquors includes the steps of contacting the liquor with activated carbon, removing at least portion of the activated carbon, treating this with hydronium or a metallic cation or cations or molecular complexes thereof, the cations or complexes having an affinity for the cyanide ion sufficiently high to cause precipitation of insoluble precious metal cyanide according to either of the equations.

or

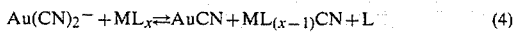

in which M is hydrogen or a metal and L is a ligand and x is the number of ligands; and recontacting the thus treated activated carbon with cyanide liquor.

The cyanide liquor may be a leach liquor, or an unleached liquor to which leach reagents are added, or a semileached liquor.

The metal cation (or complex) may be copper, mercury or silver as chloride, sulphate or nitrate, all of which are able to precipitate insoluble AuCN from a solution of $Au(CN)_2^-$ anions, but from an economical and practical point of view, inorganic acids and copper salts or complexes are preferred.

It will be appreciated that reactions in equations (3) and (4) may be enchanced by increased temperatures.

According further to the invention the activated carbon loaded irreversibly with precious metal cyanide is treated with a cyanide solution to convert the insoluble AuCN to $Au(CN)_2^-$.

BRIEF DESCRIPTION OF THE DRAWING

FIG. 1 shows the relationship between loading of gold on carbon and equilibrium gold concentrate in solution.

FIG. 2 shows the relationship between cumulative gold loading on carbon and equilibrium gold concentration in solution.

FIG. 3 shows the relationship between cumulative gold loading on carbon and equilibrium gold concentration in solution in tests conducted under somewhat different conditions to the tests shown in the realtionship illustrated in FIG. 2.

FIG. 4 shows the relationship between cumulative silver loading on carbon and equilibrium silver concentration in solution.

FIG. 5 and FIG. 6 are flow sheets illustrating respective processes in accordance with the invention.

DESCRIPTION OF EMBODIMENTS

EXAMPLE 1

Two parallel series of tests were conducted. In the first series, 0.5000 g of granular activated carbon was contacted with 100 ml of a solution containing 20 mg.$l^{-1}$ gold (dissolved as K Au(CN)$_2$), 100 mg.$l^{-1}$ calcium (dissolved as CaCl$_2$) and 100 mg. $l^{-1}$ cyanide (dissolved as KCN) at a pH value of about 11. The mixtures were agitated continuously for two hours after which aliquots were extracted and analysed for gold content by atomic adsorption spectrophotometry. After screening the carbon from the solution, it was added to a fresh 100 ml aliquot of solution and agitated for a further 2 hours. This procedure was repeated eight times, and the results were manipulated to generate a gold adsorption isotherm, by plotting the cumulative gold loading of the carbon vs the equilibrium gold concentration in solution. (Curve A of FIG. 2).

In the second series of tests, the above procedure was repeated, except that the carbon in this instance, after each loading cycle, was contacted with a hot hydrochloric acid solution for 30 minutes. Prior to contacting the carbon with 100 ml of fresh solution, the carbon was well washed with deionized water until a pH value of 5 was achieved. This gold adsorption isotherm obtained is shown as curve B in FIG. 2 and is plotted in the form of the cumulative gold loading of the carbon versus the equilibrium gold concentration in solution.

From these data, it is apparent that treatment of the carbon with hot acid, which converts the adsorbed gold dicyanide into insoluble gold cyanide, has a beneficial effect on the amount of gold that can be extracted onto activated carbon from alkali solutions.

EXAMPLE 2

The second series of tests discussed in Example 1 was repeated, except that the carbon, in this instance, after each loading cycle was soaked at room temperature for 1 hour in a solution containing 1000 mg. $l^{-1}$ copper dissolved as cupric sulphate, the pH value of which was adjusted to 1 with sulphuric acid.

The carbon was well washed with deionized water prior to conducting the next loading cycle.

The cumulative gold adsorption isotherm obtained under these conditions (curve C) is compared with that obtained in the absence of a treatment step, (curve D) in FIG. 3. The results indicate that although this treatment does enchance the gold loading capacity of the carbon, this treatment is not as effective as that with hot acid.

EXAMPLE 3

The same sequence of experiments, as discussed under Example 1, were repeated with a solution containing 20 mg. $l^{-1}$ of silver (dissolved as KAg(CN)$_2$) to which 100 mg. $l^{-1}$ of calcium and 100 mg. $l^{-1}$ of cyanide was added. The final pH value of the solution was about 10.5. Cumulative silver adsorption isotherms for loading without acid treatment (curve E), and with acid treatment (curve F) are shown in FIG. 4, where it is also apparent that the treatment of the silver loaded carbon with hot hydrochloric acid solution enchances the capacity of carbon to extract silver from alkaline medium. In this case, the reaction shown in Equation (5) is responsible for the increased silver loading.

$$Ag(CN)_2^- + H^+ \rightleftharpoons AgCN_{(insoluble)} + HCN \qquad (5)$$

EXAMPLE 4

The gold loaded carbons from the test runs described in Example 1, were contacted with a 2 percent solution of potassium cyanide at room temperature, and the amount of gold desorbed versus time was monitored. The percent gold eluted, based on cumulative gold content of the carbon after 8 loading cycles was calculated after 30,60 and 120 minutes. From the results it was apparent that the gold in the acid treated carbon is eluted more readily than that in the untreated carbon.

This is due to the insoluble gold cyanide in the acid treated carbon being converted to reversibly loaded gold di-cyanide in the presence of excess cyanide, by reversal of the reaction shown in Equation (2).

Similar behaviour would be expected of silver cyanide that is present on acid treated carbon.

Thus the full advantage of this invention can be realised, by employing a cold cyanide elution procedure to desorb the additional precious metal content that is extracted by the carbon owing to the hot acid treatment step.

FLOWSHEETS

Two embodiments of the invention are described herebelow with reference to flowsheets FIGS. 5 and 6.

FIG. 5 is more suited to the treatment of slurries of fairly high pulp density, in which the settling rate of activated carbon is not high. FIG. 6 is more suited to the treatment of clear liquids and slurries of relatively low pulp density in which the settling rate of activated carbon is fairly high.

Where higher recoveries are required than can be practically achieved over a single adsorption section, these may be coupled in series. The carbon exiting from each section can be variously treated. Typically however, such carbon would be passed to an individual circuit for converting metal cyanide which have been loaded reversibly into irreversibly held species before being moved countercurrent to the upstream circuit.

A portion of the carbon from the uppermost circuit would be split off to feed an elution circuit.

With respect to FIG. 1, slurry (1) is fed to a preparation screen (2) which scalps out oversize particles which may contaminate the carbon stream (1). The slurry (1) may either be unleached, in which case leach reagents are added to it, semi-leached, or essentially completely leached depending on which approach has greatest economic benefit.

The oversize (5) of screen (2) is generally discarded, but may be treated further if there is sufficient previous metal content.

The undersize (3) of screen (2) enters the first vessel (4) the adsorption train. Recycled carbon (21) is also fed to vessel (4). The mixture flows downstream to further adsorption vessels (6).

The combined stream (7) of slurry and carbon which flows between the sequential adsorption vessels (4) and (6) does not have to undergo interstage screening because of the co-current contacting of the carbon with the liquor.

The final tails (8) of the adsorption process are passed over a carbon catch screen (9) which recovers carbon (11) which has adsorbed further amounts of reversibly loading metal cyanides in the preceding adsorption stages (4) and (6). The slurry residue (10) is discarded.

The carbon (11) which has received its fresh incremental loading of reversibly loaded metal cyanides in the stages (4) and (6) is split by a splitter (12) into a recycle stream (14) and a stream (13) which is fed to the elution circuit (15). The eluant (17) strips most of the metal cyanides into the eluate (18). The eluate (18) can be sent to further processing, e.g. electrowinning to recover precious metals. The stripped carbon (16) is combined with carbon stream (14) to form stream (19) which is fed to a circuit (20) where all reversibly loaded metal cyanides are converted to the irreversibly loaded species.

Depending on the amount of organic poisons fed into the adsorption circuit, carbon regeneration facilities can be installed to treat either the stream of eluted carbon (16), the stream of carbon fed to the adsorption circuit (21), or a portion thereof.

With respect to FIG. 6 leachate (101) is fed to the base of an upflow column (102) where it meets carbon (103) which has had all reversibly loaded metal cyanides converted to irreversibly loaded species. Stripped leachate (104) is discarded, preferably via a safety device e.g. a screen to recover carbon which might be carried out of the column.

A stream of carbon (105) which has adsorbed a fresh incremental loading of reversibly loaded metal cyanides is continually withdrawn and split by a splitter (106) into a recycle stream (107) and a stream (108) which is fed to the elution circuit (109) where eluant (113) is used to strip off the irreversibly loaded metal cyanides fed in with the carbon as reversibly loaded species. The eluate (114) can be sent to further processing, e.g. electrowinning to recover precious metals.

The stripped carbon (110) is mixed the bypass stream (107) to form the combined carbon stream (111) which is passed to a circuit (112) where all reversibly loaded species are converted to the irreversibly loaded species. The resultant stream (103) is returned to the adsorption column (102).

Depending on the amount of organic poisons fed into the adsorption circuit, carbon regeneration facilities can be installed to treat either the stream of eluted carbon (110), the stream of carbon fed to the adsorption column (103), or a portion thereof.

Although the characteristics of upflow columns are such that countercurrent contacting of leachate and pulp can be effected as implied in FIG. 2, this is not essential for acceptable performance since the flowsheet provides for rapid conversion of reversibly loaded metal cyanides to the irreversibly loaded species.

I claim:

1. A method of facilitating the recovery precious metals from cyanide liquors, which includes the steps of contacting the liquor with activated carbon, removing at least portion of the activated carbon, treating this with at least one member of a group consisting of a cation chosen from hydronium and metals and molecular complexes thereof, the member of the group having an affinity for the cyanide ion sufficiently high to cause precipitation of insoluable precious metal cyanide according to either of the equations $$Au(CN)_2^- + M^{n+} \rightleftharpoons AuCN + MCN \quad (3)$$

and $$Au(CN)_2^- + ML_x \rightleftharpoons AuCN + ML_{(x-1)} + L \quad (4)$$

in which M is a material selected from the group consisting of hydrogen and a metal and L is a ligand and x is the number of ligands; and recontacting the thus treated activated carbon with cyanide liquor.

2. The method of claim 1 in which the metal is chosen from the group comprising copper, mercury and silver, and the ligand is chosen from chloride, nitrate and sulphate.

3. A method of recovering precious metals from cyanide liquors, which includes the steps of contacting the liquor with activated carbon loaded reversibly in respect of a cation selected from the group consisting of $Au(CN)_2^-$ and $Ag(CN)_2^-$, with at least one member of a group comprising a cation chosen from hydronium and metal and molecular complexes thereof, the chosen member of the group having an affinity for the cyanide ion sufficiently high to cause precipitation of insoluble precious metal cyanide according to either of the equations $$Au(Cn)_2^- + M^{n+} \rightleftharpoons AuCN + MCN \quad (3)$$

and $$Au(CN)_2^- + ML_x \rightleftharpoons AuCN + ML_{(x-1)} + L \quad (4)$$

in which M is a material selected from the group consisting of hydrogen and a metal and L is a ligand and x is the number of ligands, and recycling the thus treated activated carbon.

4. The method of claim 1 in which the activated carbon containing the either one of adsorbed insoluble gold and silver cyanide is treated with a cyanide solution to convert the AuCN or AgCn to $Au(CN)_2^-$ or $Ag(CN)_2^-$.

5. The method of claim 3 in which the activated carbon containing the either one of adsorbed insoluble gold and silver cyanide is treated with a cyanide solution to convert the AuCN or AgCN to $Au(CN)_2^-$ or $Ag(CN)_2^-$.

* * * * *